United States Patent
Leffler et al.

(10) Patent No.: US 10,371,299 B2
(45) Date of Patent: Aug. 6, 2019

(54) QUICK CONNECTOR WITH ANTI-ROTATE FEATURE

(71) Applicant: MANN+HUMMEL GMBH, Ludwigsburg (DE)

(72) Inventors: Joseph Leffler, Mattawan, MI (US); David Hewkin, Battle Creek, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 562 days.

(21) Appl. No.: 15/131,962

(22) Filed: Apr. 18, 2016

(65) Prior Publication Data
US 2017/0299100 A1    Oct. 19, 2017

(51) Int. Cl.
*F16L 37/26* (2006.01)
*F16L 37/252* (2006.01)

(52) U.S. Cl.
CPC .............. *F16L 37/252* (2013.01); *F16L 37/26* (2013.01)

(58) Field of Classification Search
CPC ..... F16L 37/252; F16L 37/26; F16L 37/0848; F16L 37/12; F16L 37/1205; F16L 33/2073; F16L 33/2075; F16L 33/2078; F16L 37/0841; F16L 37/084; F16L 37/0847; F16L 37/096; F16L 37/098; F16L 37/0985; F16L 37/121; F16L 37/133; F16L 37/138; F16L 37/24; F16L 25/025

See application file for complete search history.

(56) References Cited

U.S. PATENT DOCUMENTS

| | | | | |
|---|---|---|---|---|
| 71,266 A | * | 11/1867 | Bedford | F16L 37/252 285/87 |
| 593,190 A | * | 11/1897 | Bernhardt | F16L 37/0841 285/317 |
| 796,220 A | * | 8/1905 | Jones | F16L 37/252 285/317 |
| 839,297 A | * | 12/1906 | Kennedy et al. | F16L 37/0841 285/317 |
| 929,067 A | * | 7/1909 | Williamson | F16L 37/0841 285/317 |
| 5,772,355 A | | 6/1998 | Ross et al. | |
| 5,947,531 A | * | 9/1999 | Eckard | F16L 37/1205 285/319 |
| 6,595,556 B1 | * | 7/2003 | Zenko | F16L 37/008 285/140.1 |
| 2004/0041398 A1 | | 3/2004 | Zenko et al. | |

FOREIGN PATENT DOCUMENTS

| | | | | |
|---|---|---|---|---|
| DE | 1475808 B1 | * | 1/1970 | ............. F16L 21/08 |
| EP | 2957809 A1 | * | 12/2015 | ............. F16L 27/108 |
| FR | 2876776 A1 | * | 4/2006 | ............. F16L 37/133 |
| WO | 2012022489 A2 | | 2/2012 | |

* cited by examiner

*Primary Examiner* — David Bochna
*Assistant Examiner* — James A Linford
(74) *Attorney, Agent, or Firm* — James Hasselbeck

(57) ABSTRACT

A quick connector assembly connects to and establishes fluid communication with a male end port. The quick connector assembly includes a female component and an internal clip carried by the female component. The quick connector assembly receives the male end port in a single predetermined rotational orientation for retaining the male end port and the quick connector assembly non-rotatable receives the male end port.

12 Claims, 6 Drawing Sheets

US 10,371,299 B2

QUICK CONNECTOR WITH ANTI-ROTATE FEATURE

FIELD

The present teachings generally relate to quick connector assemblies for quickly connecting to and establishing fluid communication with a male end form. More particularly, the present teachings relate to a quick connector assembly with an anti-rotation feature. The present teachings also more particularly relate to a quick connector assembly requiring a predetermined rotational alignment with the male end form for secure connection.

BACKGROUND

Quick connector assemblies are used in many different applications for quickly connecting to and establishing fluid communication with a male end form. A quick connector assembly may be carried by a first tube or hose and the male end form may be carried by a second tube or hose. Such quick connector assemblies are often used on vehicle assembly lines, for example, so that the male end form may be quickly engaged with the quick connector assembly to minimize assembly time and associated labor.

It is important that a quick connector assembly be reliable and establish a fluid-tight seal with the male end form that will not leak or otherwise disengage from the male end form. In certain vehicle applications, quick connector assemblies may be used to transmit incompletely burned fuel back to a combustion chamber for further combustion. Quick connectors may also be used for the transmission of various other gases and liquids for vehicle and other applications.

While known quick connector assemblies have generally proven to be satisfactory for their intended purposes, a continuous need for improvement remains in the pertinent art.

SUMMARY

In accordance with one particular application, the present teachings provide a fluid transfer arrangement including a male end port and a quick connector assembly. The male end port has a tubular portion and a rib circumferentially extending at least partially around the tubular portion. The quick connector assembly connects to and establishes fluid communication with the male end port. The quick connector assembly includes a female component and an internal clip carried by the female component. The quick connector assembly receives the male end port in a single predetermined rotational orientation for retaining the male end port and the quick connector assembly non-rotatably receives the male end port.

In accordance with another particular application, the present teachings provide a quick connector assembly for connecting to and establishing fluid communication with a male end port. The quick connector assembly includes a female component and an internal clip carried by the female component. The internal clip includes a circumferentially extending retention member cantilevered from a remainder of the internal clip. The retention member is elastically movable in a generally radial direction from a first position to a second position.

In accordance with still yet another particular application, the present teachings provide a fluid transfer arrangement including a male end port and a quick connector assembly. The male end port has a tubular portion and a rib circumferentially extending at least partially around the tubular portion. The quick connector assembly connects to and establishes fluid communication with the male end port. The quick connector assembly includes a female component and an internal clip carried by the female component. The internal clip includes a generally cylindrical portion and a cantilevered retention portion. The cantilevered retention portion is axially spaced from the cylindrical portion by a gap having an axial gap width. The rib of the male end port has a first axial rib width less than the axial gap width and a second axial rib width greater than the axial gap width such that the male end port is positioned in a single predetermined rotational orientation for engagement with the quick connector assembly.

Further areas of applicability will become apparent from the description provided herein. The description and specific examples in this summary are intended for purposes of illustration only and are not intended to limit the scope of the present disclosure.

DESCRIPTION OF THE DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
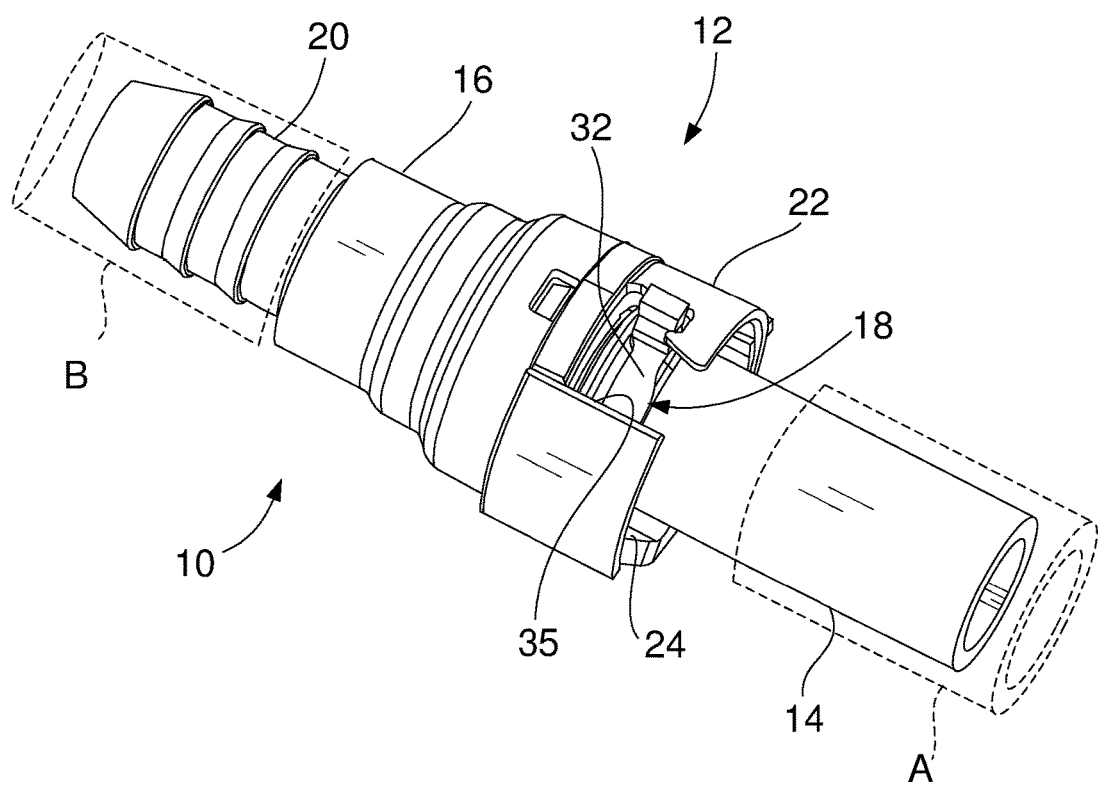
FIG. 1 is a perspective view of a quick connector assembly in accordance with the present teachings, the quick connector assembly shown operatively associated with a male end port.
Figure 2:
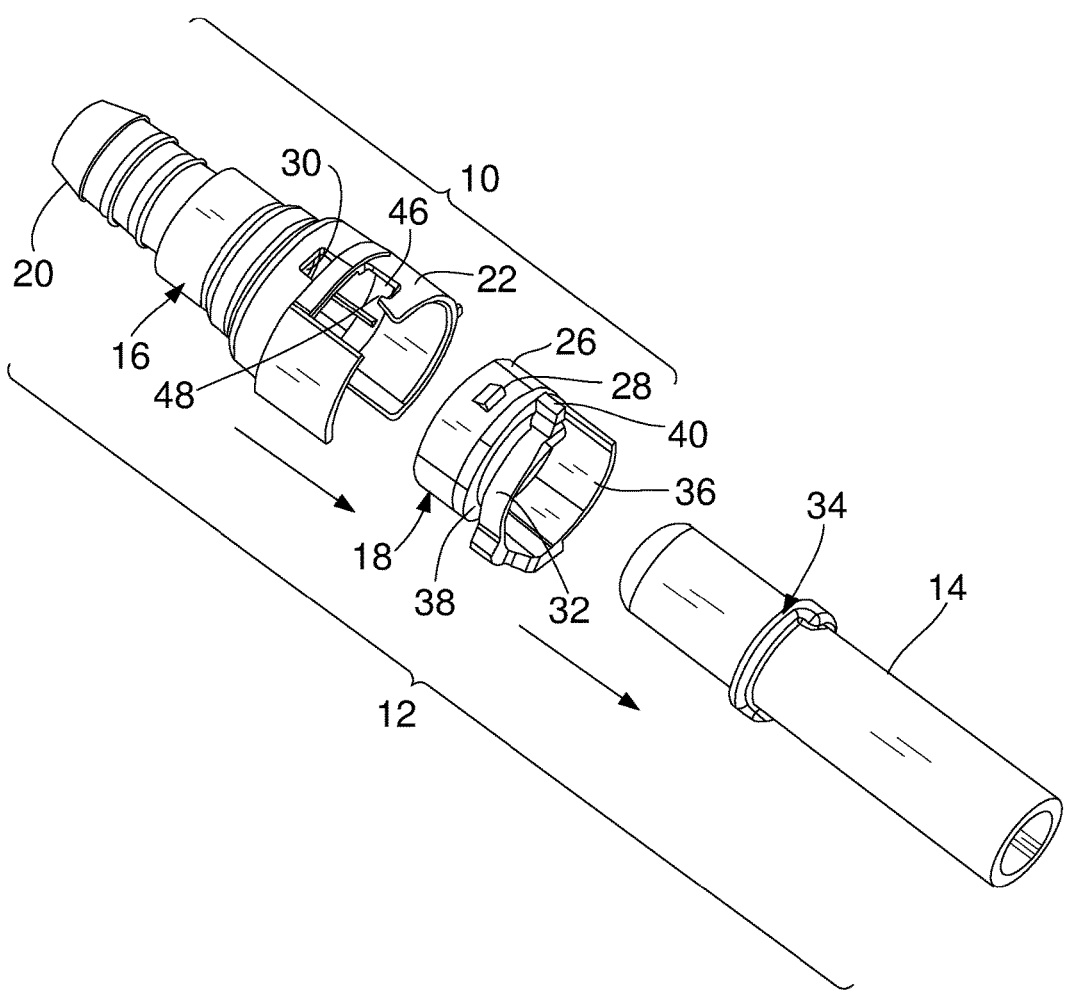
FIG. 2 is an exploded perspective view of the quick connector assembly and male end port of FIG. 1.
Figure 3:
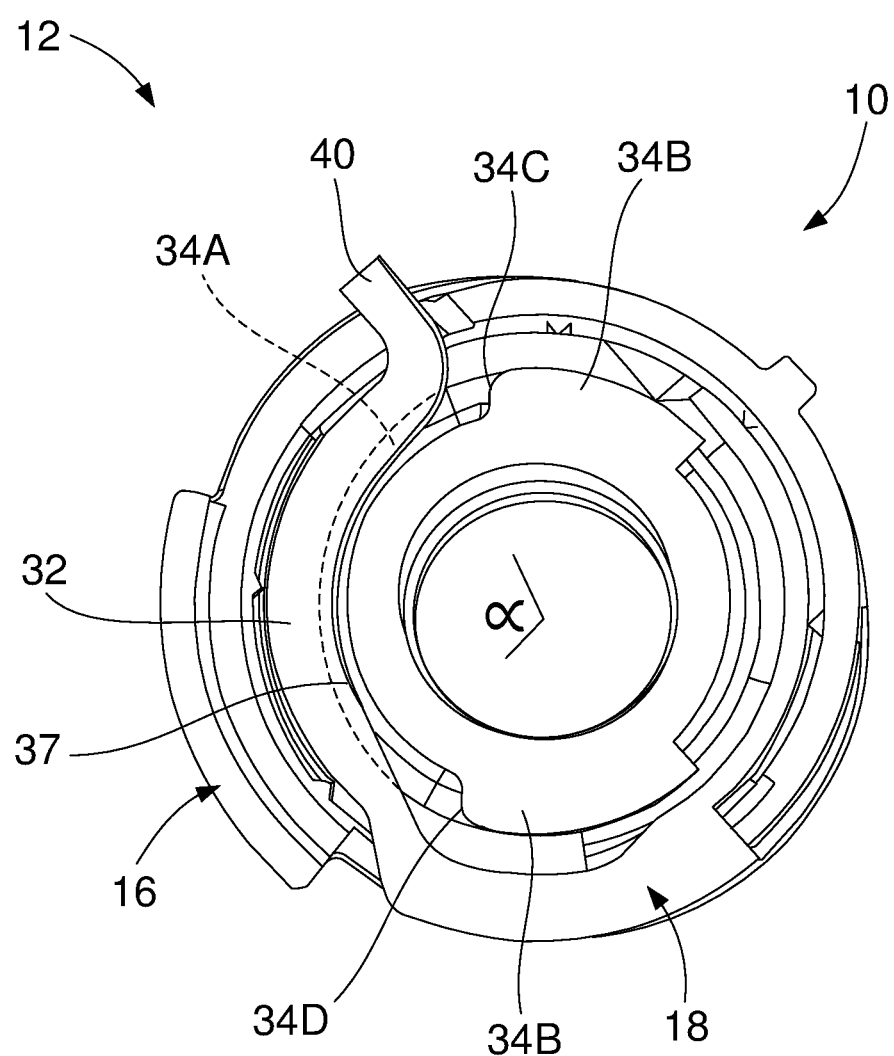
FIG. 3 is an end view of the quick connector assembly and male end port of FIG. 1.

With reference to FIGS. 1 through 6 of the drawings, a quick connector assembly constructed in accordance with the present teachings is illustrated and generally identified at reference character 10. In various views, the quick connector assembly 10 is shown incorporated into a fluid transfer assembly 12 including a male end port 14. In the exemplary embodiment illustrated, the quick connector assembly 10 may be used in motor vehicle applications for the transmission of fluids in the form of gas or liquid. It will be appreciated, however, that the scope of the present teachings are not so limited and may readily be adapted for non-vehicle applications. In FIG. 1, the quick connector assembly 10 is shown operatively associated with a first hose or tube A (shown in dashed lines) and the male end port 14 is shown operatively associated with a second hose or tube B (again shown in dashed lines).

The quick connector assembly 10 is illustrated to generally include a shell or female member 16 and an internal clip 18. As will be further appreciated below, the internal clip 18 is non-releasably carried by the shell 16 and the male end port 14 can be releasably connected to the quick connector assembly 10 through the internal clip 18. In the embodiment illustrated, the quick connector assembly 10 receives the male end port 14 in a single, predetermined rotational orientation for retention to the quick connector assembly 10. Further in the embodiment illustrated, the male end port 14 is non-rotationally received by the quick connector assembly 10.

The shell 16 includes a first end 20 having a barbed configuration for coupling with the first hose B. The shell 16 further includes a second end 22 defining an opening for receiving the internal clip 18. A fluid path longitudinally extends through the shell 16 from the first end 20 to the second end 22. The shell 16 may be unitarily constructed of plastic or other suitable material.

The internal clip 18 may include a cylindrical end 26. The cylindrical end 26 may be integrally formed to include a radially extending detent 28. Upon assembly, the radially extending detent 28 may be received within a radially extending opening 30 defined by the shell 16. The detent 28 may include a ramped lead-in surface to facilitate insertion of the internal clip 18 and a rearwardly facing stop surface to prevent removal of the internal clip 18. In this manner, the quick connector assembly 10 is designed such that removal of the internal clip 18 requires destruction of the quick connector assembly 10.

The internal clip 18 may further include a retention portion 32 that cooperates with a rib 34 of the male end port 14 in a manner further discussed below to retain the male end port 14. The retention portion 32 may circumferentially extend from a remainder of the internal clip 18. As illustrated, an end 36 of the internal clip 18 opposite the cylindrical end 26 may be partially cylindrical. The retention portion 32 may extend from the partially cylindrical end 36 and may cooperate with the partially cylindrical end 36 to partially define an internal diameter generally equal to an internal diameter of the cylindrical end 26. The retention portion 32 may be elastically movable in a generally radial direction between a first position (shown throughout the drawings) to a second position. The internal clip 18 may be unitarily constructed of plastic or other suitable material that allows such elastic movement of the retention portion 32 from the first position to the second position. The retention portion 32 may be axially spaced from the cylindrical end 26 by a gap 38. The gap 38 may have an axially extending gap width $W_G$ (see FIG. 5). A free end of the retention portion 32 may include a radially extending portion 40.

In the embodiment illustrated, the rib 34 only partially extends around the male end port 14. By eliminating a portion of the rib 34, more tooling options are created and additional manufacturing actions are potentially eliminated. In addition, a risk of unintended or premature disconnections may be reduced or eliminated.

In one application, the rib 34 circumferentially extends no more than 270 degrees around the male end port 14. As illustrated, the rib 34 may circumferentially extend approximately 270 degrees around the male end port 14. The rib 34 may include a first portion 34A having a first axial width $W_{R1}$ (see FIG. 5) and at least a second portion 34B having a second axial width $W_{R2}$ (see FIG. 6). A illustrated, the first portion 34A is a central portion and the rib 34 includes two second portions 34B at opposite ends thereof. The first axial width $W_{R1}$ may be less than the gap width $W_G$. The second axial width $W_{R2}$ may be greater than the gap width $W_G$.

Before connecting the quick connector 10 to the male end port 14, the quick connector 10 must be in an assembled state. In other words, the internal clip 18 is secured to the shell 16. The internal clip 18 is aligned for insertion into the second end 22 of the shell 16 such that the ramped lead in surface of the radially extending detent 28 faces the second end 22 of the shell and is rotationally aligned with the radially extending opening 30 of the shell 16. The internal clip 18 is then pressed into the open end of the quick connector 10. The ramped lead-in surface of the radially extending detent 28 may reach and engage the radially extending opening 30 of the shell 16. As noted above, upon assembly the internal clip 18 is generally not removable from the shell 16 without destruction of the shell 16.

A fluid connection between the male end port 14 and the quick connector assembly 10 may be quickly established by axially inserting the male end port 14 into the quick connector assembly 10. The male end port 14 is aligned to face the internal clip 18 to enter the open second end 22 of the shell 16 of quick connector assembly 10. The male end port 14 and the quick connector assembly 10 are rotationally aligned such that the narrow first rib portion 34A of the rib 34 is rotationally aligned with the retention portion 32 of the internal clip 18. The male end port 14 and the quick connector assembly 10 are then axially moved together such that the ramped or rounded lead in surface of the first rib portion 34A engages the retention portion 32 and deflects or bends the retention portion 32 radially outwardly, permitting the male port end 14 and rib portion 34 to pass into the gap 38. The retention portion 32 may elastically return to the first position or undeflected position by the inherent resiliency of the internal clip 18, engaging into a recess formed behind the first rib portion 34A relative to the second rib portion 34B and thereby axially locking the quick connector 10 onto the male end port 14. The elastic return of the retention portion 32 to the first position may be associated with an audible "click" indicating to the user that a secure connection has been established. If the male end port 14 is not properly aligned, an area of interference 42 will exist between the retention portion 32 and the increased width of the second portion 34B of the rib 34. Furthermore, the user will not receive the audible "click" expected with a secure connection.

Upon connection, the retention portion 32 will be located in a circumferentially extending window 35 defined by the end 22 of the shell 16. The window 35 may also extend axially to the end of the shell 16. After the quick connector 10 is locked onto the male end port 14, the radially outwardly extending portion 40 or release arm 40 may be moved, if needed or desired, over the ramped face of the locking structure 46 over and behind the retention projection 48 to lockably engage into locking structure 46, thereby preventing the removal of the male end port 14 from the quick connector assembly 10 such as to form a secure, fixed, rotationally locked connection. The retention portion 32 and the rib 34 of the male end port 14 will axially abut one another at an engagement area 37. The engagement area 37 may extend through an angle $\alpha$ (see FIG. 3). In one application, the angle $\alpha$ may be at least 90 degrees. In another application, the angle $\alpha$ may be approximately 100 degrees. The engagement area 37 is the area behind the retention portion 32, in FIG. 3, as outlined by the dashed portion of the rib 34.

Figure 4:
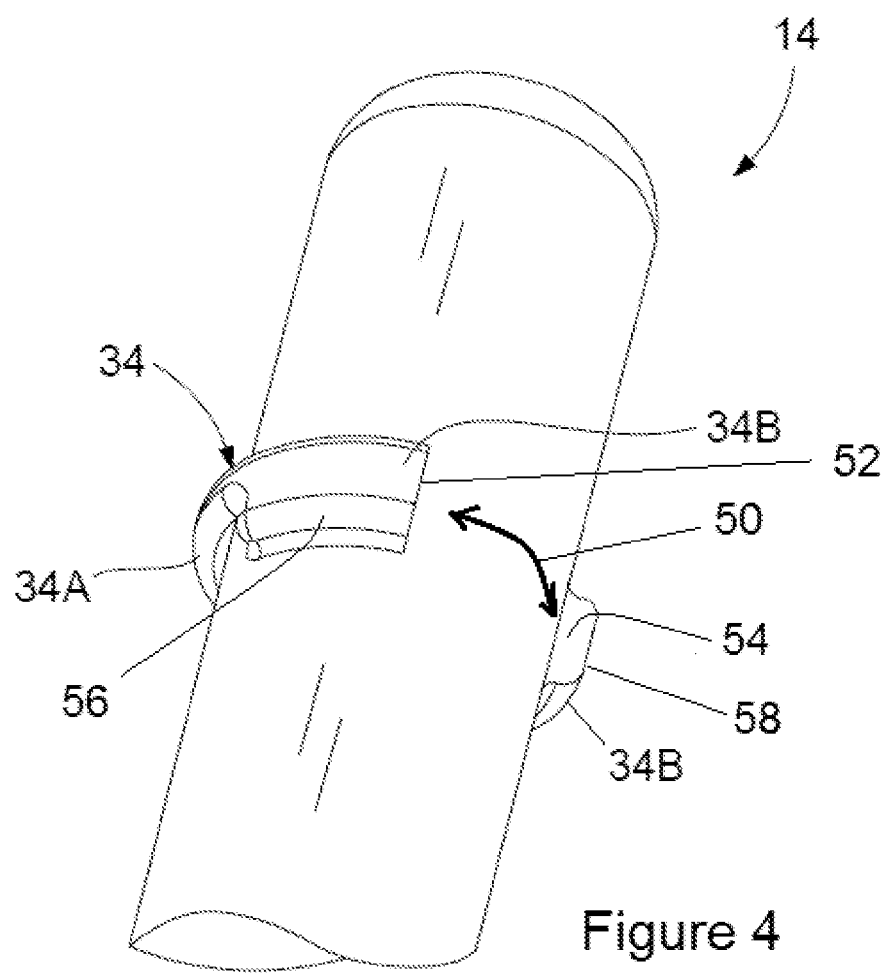
FIG. 4 is a perspective view of the male end port of FIG. 1.
Figure 5:
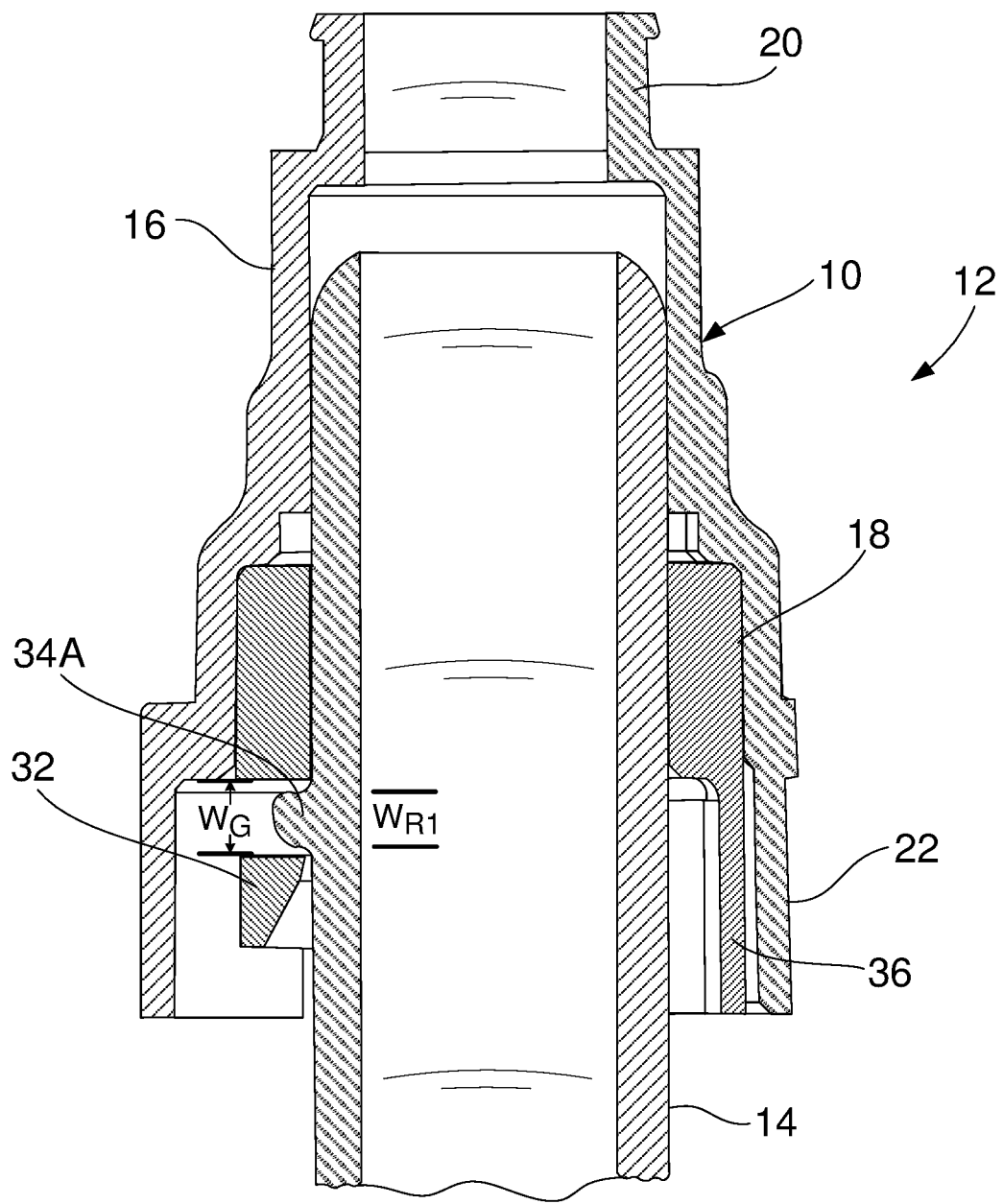
FIG. 5 is a cross-sectional view of the quick connector assembly and male end port of FIG. 1, the male end port shown in a desired rotational position with a retention member of an internal clip of the quick connector assembly engaged with a rib of the male end port to securely retain the male end port.
Figure 6:
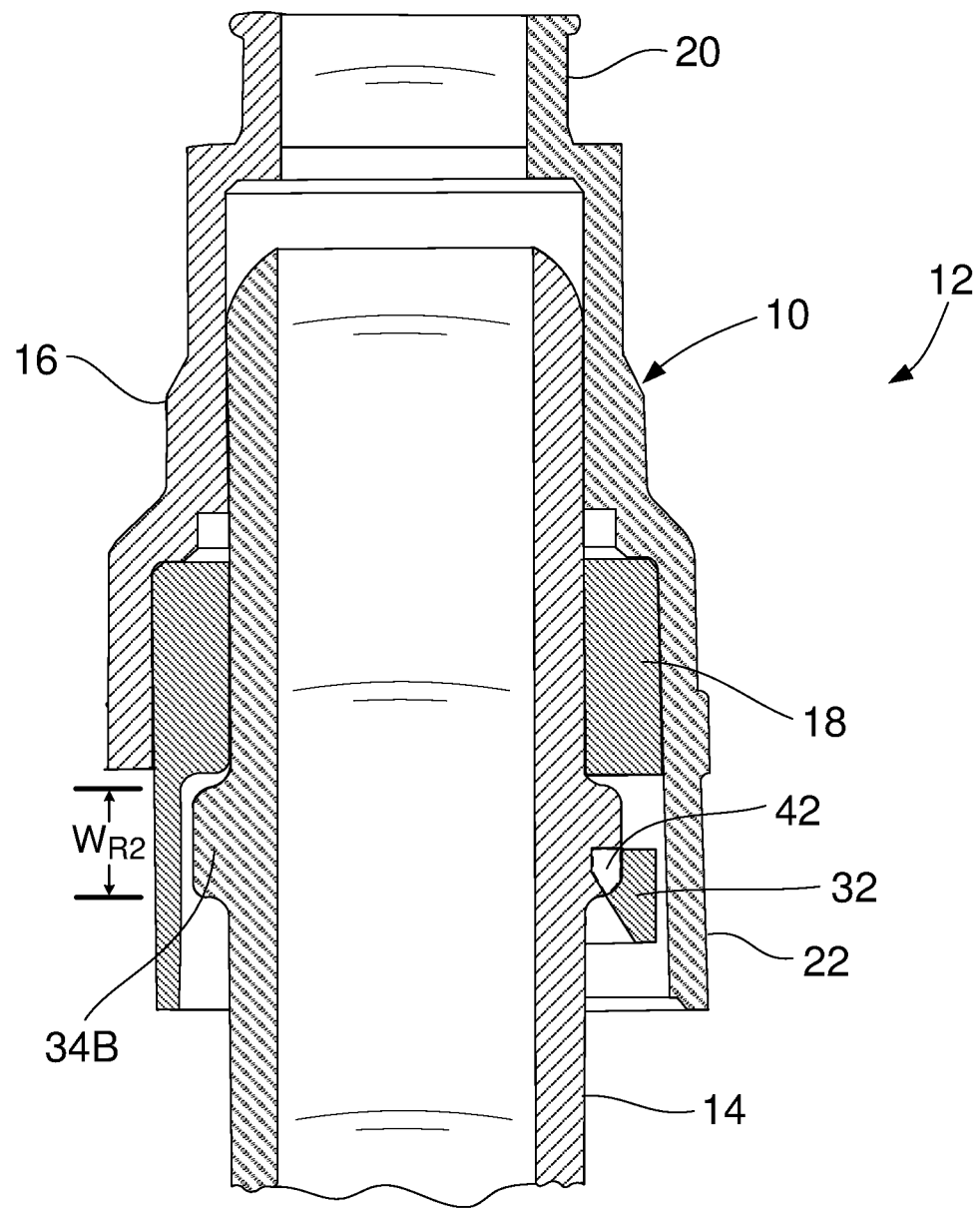
FIG. 6 is a cross-sectional view similar to FIG. 5, the male end port shown in an undesired rotational position resulting in interference between the retention member of the internal clip and the rib of the male end port that prevents secure engagement of the quick connector assembly with the male end port.

The rib 34 may define first and second blocking surfaces 34C and 34D. As shown of FIG. 4, preferably the rib 34 extends only partially about a radially outer circumference of the male end port 14, leaving a gap 50 (see FIG. 4) between a first 52 and a second 54 circumferential ends (See FIG. 4) of the rib 34. The rib preferably has a first portion 34A of the rib 34 that extends from the first circumferential end 52 of the rib 34 to the second circumferential end 54 of the rib 34, leaving the gap 50 therebetween. As shown, a second portion 34B of the rib 34 is arranged against and connected to the first portion 34a, the second portion 34. As shown in FIG. 4, a first blocking member 56 of the second portion 34B extends from the first circumferential end 52 of the rib 34 and extends to terminate at a first blocking surface 34C. In FIG. 4, a second blocking member 58 of the second portion 34B extends from the second circumferential end 54 of the rib 34 to terminate at a second blocking surface 34D. The engagement area 37 is arranged in the gap 50 between the second portions 34B (see FIG. 4). The first and second blocking surfaces 34C and 34D may cooperate with the internal clip 18 to prevent rotation of the male end port 14 relative to the internal clip 18. This anti-rotation feature ensures that the engagement area of the retention portion 32 does not reach the removed portion of the rib 34.

To facilitate removal of the male end port 14, the retention portion 32 may be manually moved from the first or undeflected position toward the second or deflected position. In this regard, the radially extending portion 40 of the retention portion 32 may be manually moved by the user to displace the retention portion 32 in a generally radial direction against its inherent bias to ride over the retention projection 48 and permit the radial outward deflection of the retention portion 32 to ride over the first rib portion 34A. The male end port 14 may then be axially removed from the quick connector assembly 10.

The quick connector 10 advantageously enforces a predetermined rotational alignment with the male end port 14, requiring the quick connector 10 to have a fixed rotational alignment with the male port end 14. In this manner, easy access can be provided to the radially outwardly extending portion 40 of the retention portion 32, even in tight access spaces. Such tight spaces are common, for example, in the cramped spaces with an engine compartment of a motor vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:
1. A fluid transfer arrangement comprising:
a male end port including a tubular portion, the male end port comprising:
a rib extending circumferentially on a radially outer surface of the male end port, the rib extending only partially about a radially outer circumference of the male end port, leaving a gap between a first and a second circumferential ends of the rib, the rib comprising:
  a first portion of the rib that extends continuously from the first circumferential end of the rib to the second circumferential end of the rib, leaving the gap open therebetween;
  a second portion of the rib arranged against and connected to the first portion, the second portion having:
    a first blocking member of the second portion extending from the first circumferential end of the rib and continuing circumferentially on the first portion to terminate at a first blocking surface;
    a second blocking member of the second portion extending from the second circumferential end of the rib and continuing circumferentially on the first portion to terminate at a second blocking surface;
    wherein an engagement area is formed by circumferential open space in the second portion of the rib between and circumferentially delimited by the first blocking surface and the second blocking surface;
  wherein the first portion of the rib has a first width in an axial direction; and
  wherein the second portion of the rib has a second width that is greater than the first width; and
a quick connector assembly for connecting to and establishing fluid communication with the male end port, the quick connector assembly including:
  a female component; and
  an internal clip carried by the female component,
wherein the quick connector assembly receives the male end port in a single predetermined rotational orientation for retaining the male end port and the quick connector assembly non-rotatably receives the male end port.

2. The fluid transfer arrangement of claim 1, wherein the internal clip includes a circumferentially extending retention member elastically movable relative to a remainder of the internal clip in a generally radial direction from a first position to a second position such that the first portion of the rib of the male end port axially moves past the retention member upon insertion of the male end port into the quick connector assembly.

3. The fluid transfer arrangement of claim 2, wherein the retention member is received into and engages into engagement area between the first blocking surface and the second blocking surface of the second portion of the rib to prevent relative rotation.

4. The fluid transfer arrangement of claim 1, wherein the internal clip and the rib of the male end port are cooperatively configured such that the second portion of the rib cannot axially pass beyond the retention member.

5. The fluid transfer arrangement of claim 4, wherein the engagement area between the retention member of the internal clip and the rib of the male end port blocking removal of the male end port from the quick connector assembly extends through at least 90 degrees.

6. The fluid transfer arrangement of claim 5, wherein the engagement area extends through approximately 100 degrees.

7. A fluid transfer arrangement comprising:
a male end port including
  a tubular portion and
  a rib extending circumferentially on a radially outer surface of the tubular portion of the male end port, the rib extending only partially about a radially outer circumference of the male end port, leaving a gap between a first and a second circumferential ends of the rib, the rib comprising:
  a first portion of the rib that extends continuously from the first circumferential end of the rib to the second circumferential end of the rib, leaving the gap open therebetween;
  a second portion of the rib arranged against and connected to the first portion, the second portion having:
    a first blocking member of the second portion extending from the first circumferential end of the rib and continuing circumferentially on the first portion to terminate at a first blocking surface;
    a second blocking member of the second portion extending from the second circumferential end of the rib and continuing circumferentially on the first portion to terminate at a second blocking surface;
    wherein an engagement area is formed by circumferential open space in the second portion of the rib between and circumferentially delimited by the first blocking surface and the second blocking surface;
  wherein the first portion of the rib has a first width in an axial direction; and
  wherein the second portion of the rib has a second width that is greater than the first width; and
a quick connector assembly for connecting to and establishing fluid communication with the male end port, the quick connector assembly including:
a female component; and
an internal clip carried by the female component,
the internal clip including
  a generally cylindrical portion and
  a cantilevered retention portion,
  the cantilevered retention portion axially spaced from the cylindrical portion by a gap having an axial gap width,
wherein the rib of the male end port has a first axial rib width less than the axial gap width and a second axial rib width greater than the axial gap width such that the male end port is positioned in a single predetermined rotational orientation for engagement with the quick connector assembly.

8. The fluid transfer arrangement of claim 7, wherein a portion of the rib having the second axial rib width rotationally engages the retention portion to prevent rotation between the male end port and the quick connector assembly.

9. The fluid transfer arrangement of claim 7, wherein the cantilevered retention portion is radially movable from a first position to a second position for receiving and releasing the male end port.

10. The fluid transfer arrangement of claim 7, wherein a portion of the rib having the first axial rib width axially abuts the cantilevered retention potion at the engagement area.

11. The fluid transfer arrangement of claim 10, wherein the engagement area extends through at least 90 degrees.

12. The fluid transfer arrangement of claim 11, wherein the engagement portion extends through approximately 100 degrees.

* * * * *